US011717466B2

(12) United States Patent
Salle Phelippes De La Marnierre

(10) Patent No.: US 11,717,466 B2
(45) Date of Patent: Aug. 8, 2023

(54) SEX TOY

(71) Applicant: CNEX ASESORAMIENTO PARA LA IMPORTACIÓN, S.L., Mataro (ES)

(72) Inventor: Olivier Jean-Pierre Salle Phelippes De La Marnierre, Mataro (ES)

(73) Assignee: CNEX ASESORAMIENTO PARA LA IMPORTACIÓN, S.L., Mata-Rocafonda (ES)

( * ) Notice: Subject to any disclaimer, the term of this patent is extended or adjusted under 35 U.S.C. 154(b) by 575 days.

(21) Appl. No.: 16/637,081

(22) PCT Filed: Aug. 14, 2018

(86) PCT No.: PCT/ES2018/070561
§ 371 (c)(1),
(2) Date: Feb. 6, 2020

(87) PCT Pub. No.: WO2019/034800
PCT Pub. Date: Feb. 21, 2019

(65) Prior Publication Data
US 2020/0246215 A1    Aug. 6, 2020

(30) Foreign Application Priority Data

Aug. 14, 2017   (ES) .................................. 201731032
Aug. 16, 2017   (ES) .................................. 201731035

(51) Int. Cl.
| | | |
|---|---|---|
| *A61H 19/00* | (2006.01) | |
| *A61H 21/00* | (2006.01) | |
| *A61H 23/00* | (2006.01) | |
| *C08K 3/34* | (2006.01) | |
| *C08K 7/26* | (2006.01) | |
| *C08L 23/06* | (2006.01) | |
| *C08L 23/12* | (2006.01) | |
| *C08L 25/06* | (2006.01) | |
| *C08L 21/00* | (2006.01) | |

(52) U.S. Cl.
CPC ............. *A61H 19/00* (2013.01); *A61H 21/00* (2013.01); *A61H 23/00* (2013.01); *C08K 3/34* (2013.01); *C08K 7/26* (2013.01); *C08L 21/00* (2013.01); *C08L 23/06* (2013.01); *C08L 23/12* (2013.01); *C08L 25/06* (2013.01)

(58) Field of Classification Search
None
See application file for complete search history.

(56) References Cited

U.S. PATENT DOCUMENTS

| | | | |
|---|---|---|---|
| 5,853,362 A | 12/1998 | Jacobs | |
| 6,110,006 A | 8/2000 | Chen | |
| 2008/0227891 A1* | 9/2008 | Jarvie | .................. B28C 7/0418 524/8 |
| 2015/0298375 A1 | 10/2015 | Franssen et al. | |
| 2016/0008218 A1* | 1/2016 | Murison | ................ A61H 19/32 601/46 |

FOREIGN PATENT DOCUMENTS

| | | | | |
|---|---|---|---|---|
| DE | 202007016977 U1 * | 3/2008 | ............. A61H 19/50 |
| DE | 102009017129 A1 | 10/2010 | |
| EP | 1616906 A1 * | 1/2006 | ............. C08L 21/00 |
| FR | 1589645 A * | 3/1970 | ............ E04F 13/185 |
| JP | 08073639 A * | 3/1996 | |
| JP | 5761836 B1 * | 8/2015 | ............. A61H 19/30 |
| WO | WO-2013096615 A1 * | 6/2013 | ............... A61F 2/26 |

OTHER PUBLICATIONS

Machine translation of DE 102009017129 A1, retrieved May 2022 (Year: 2022).*
Machine translation of JP 08073639 A, retrieved May 2022 (Year: 2022).*
Machine translation of FR 1589645 A, retrieved May 2022 (Year: 2022).*
Machine translation of JP 5761836 B1, retrieved Oct. 2022 (Year: 2022).*
Machine translation of DE 202007016977 U1, retrieved Oct. 2022 (Year: 2022).*
Abstract of EP 1616906 A1, retrieved Apr. 2023 (Year: 2023).*
Int'l. Search Report for PCT/ES2018/070561, dated Jan. 18, 2019.

* cited by examiner

*Primary Examiner* — Nicole M. Buie-Hatcher
(74) *Attorney, Agent, or Firm* — MaxGoLaw PLLC

(57) ABSTRACT

A sexual toy is provided that is made from a composite material formed from joining, at least, two components, where a first component is an elastomer, and a second component is a granulated element. The sexual toy can include a sheath of silicone and a rigid core.

8 Claims, No Drawings

SEX TOY

OBJECT OF THE INVENTION

The invention, as stated in the title of this specification, refers to a sexual toy comprising a composite material, reinforced by particles, that provides the function to which it is designed with advantages and characteristics, that are disclosed in detail thereafter, that mean a novelty in the current state-of-the-art.

The object of this invention refers, concretely, to a sexual toy comprising a composite material, derived from the family of composite, thermostable or thermoplastic polymers, formed by joining an elastomer having a high resistance to deformation and an elastic behavior and a granulated element.

In a first preferred embodiment, the granulated element is a reinforcing agent in particles of an aggregate having chemical stability and high mechanical resistance, which provides a heavy material having a greater mechanical capacity than an elastomer, among other advantages, converting it in optimal for multiple applications.

In a second preferred embodiment, the granulated element is a reinforcing agent consisting in an expanded or foamed polymer having the capacity of impact absorption, lightweight and greater hardness than the elastomer matrix, which provides a material having great elastic capacities, very light among other advantages.

In a third preferred embodiment, it is contemplated that the granulated element is a reinforcing agent consisting of a mixture of particles of an aggregate and an expanded or foamed polymer.

FIELD OF APPLICATION OF THE INVENTION

The field of application of this invention is within the sector of the sexual toys such as massagers, stimulators, vibrators, dildos, real-size dolls or the rest of parts of the body replicas.

BACKGROUND OF THE INVENTION

Currently sexual toys are known made of elastomer, namely silicone. Also sexual toys are known made of glass, PVC, TPE and TPR.

Although the most usual nowadays are those of PVC, TPE, TPR, those of silicone are those of best quality, because the silicone is a hypoallergenic material as it has no pores and therefore easy to clean. In addition, the silicones can stand high temperatures. The silicone is likewise a soft material if a specific oil is applied on it and it is flexible fairly imitating the touch of the human skin.

In order to achieve a stronger rigidity of the sexual toy, sexual toys having a core of rigid material, for example rigid plastic, and a coating solely of silicone are also known.

The problem with the silicone is its expensive price. In order to cut down the cost of sexual toys, the use of a core of another material has been tested.

Another problem of the silicone is that it cannot be re-used. During the process of production of a sexual toy of silicone, there usually exists a 8% loss of material that, as it cannot be re-used, has to be discarded.

Last, each type of silicone has a density, flexibility and elasticity approximately constant. This characteristic prevents to develop sexual toys having a density, flexibility or elasticity different from those already known. For example, it is impossible to produce a bulky sexual toy integrally made of silicone having a light weight and that, consequently is easy to handle.

The objective of the invention that is sought to be patented is to find a material meeting the current requests of hygiene but that, at same time, is cheaper to be produced and allows developing sexual toys having a density, flexibility and elasticity different from those already known.

As reference to the current state-of-the-art, it shall be pointed out that, also in the market, sexual toys made of an elastomer, namely silicone, are known, at least this applicant is not aware of the existence of any composite material possessing technical, constitutive characteristics equal or similar to those that are presented and claimed herein.

EXPLANATION OF THE INVENTION

The sexual toy made of the composite material is therefore configured as a novelty within its field of application, the characterizing details that distinguish it conveniently appearing in the final claims attached to this specification.

More concretely, what the invention proposes, as it was said above, is a sexual toy made of a composite material, formed out of joining, at least, two components, where the first component is an elastomer, and a second component is a granulated element.

In a preferred embodiment, the sexual toy comprises a filling of the composite material where a first component is an elastomer, and a second component is a granulated element and an external sheath of silicone.

In this embodiment a similar sexual toy is achieved, but at same time much cheaper than one integrally made of silicone. In addition, the sexual toy keeps the external appearance, as well as the external properties as there is the sheath made of silicone.

In an even more preferred embodiment, the sexual toy comprises, in addition to the filling of composite material and the external sheath of silicone, a core of material less flexible than the composite material.

The objective of the core is to increase the rigidity of the sexual toy that can be low if it is integrally made of silicone or with a filling of the composite material and an external sheath of silicone.

The granulated element of the composite material can be varied depending on the physical characteristics wished in the sexual toy. It is provided that the granulated element can be a unique material or a mixture of materials.

In a preferred embodiment, the granulated element is an aggregate. The aggregates are materials having chemical stability and high mechanical strength, which provide significant advantages when joined to an elastomer.

It is provided that the aggregate can be natural or synthetic.

The aggregate can have any type of diameter among which powder or sand having a 0.063 to 2 millimeter diameter is preferred.

It is preferable to use recycled powder of aggregate (stone) preventing thus a residue from the industry engaged in producing objects of stone.

Thus, the main advantages of a sexual toy made of a material composed of an elastomer and an aggregate are, above all, as no more expensive materials have to be used, such as pure silicone, but also that they constitute a heavy material having a mechanical capacity greater than that of an elastomer and for the absorption of impacts, as well as its good insulating, acoustic, electric and thermal capacities.

In another preferred embodiment, the granulated element is an expanded or foamed polymer. The expanded or foamed polymers are materials having great elastic capacities, very light and with greater structural capacities than an elastomer, which provide significant advantages when joining them to an elastomer.

The expanded or foamed polymer of any type, although, it is preferably expanded polypropylene (EPP) because of its hardness, or expanded polyethylene (EPE) because of its sponginess or expanded polystyrene (EPS) because of its low price. The use of the expanded polystyrene (EPS) is the component of the best preferred embodiment although a mixture of particles of any of them is not either discarded.

With this, the main advantages provided by the sexual toy made of the material composed by an elastomer and an expanded or foamed polymer are, above all, not to have to use more expensive materials such as pure silicone, but also that it constitutes a material having great elastic capacities, very light and with greater structural capacities than an elastomer.

In another preferred embodiment it is contemplated that the composite material is formed by an elastomer, an aggregate and an expanded or foamed polymer. The rate of each type of granulated element (aggregate and expanded or foamed polymer) and therefore the density, flexibility and elasticity of the composite material can vary depending on the type of sexual toy it is wished to produce. The mixture of aggregates and expanded material allows to control the density, weight and flexibility; it has to be borne in mind that, depending on the volume of the object, it can be sought to increase or decrease the weight, increase or decrease the rigidity. The adaptability as for the density, flexibility and elasticity of the composite material and therefore of the sexual toy produced with it is a great technical advantage.

The elastomer of the composite material can be of any type, although, preferably, it is among any of the thermoplastic elastomer and more preferably among any of those containing siloxane in the main chain, that means, the silicones.

It is also possible to use latex, as elastomer, because of its low price and its semi-inert nature.

It is also possible to use PVC, as elastomer, because of its low price.

In the best preferred embodiment, the elastomer has a viscosity sufficient to prevent the relative movement of the granulated element within the elastomer in the melted phase.

The composite material, reinforced with particles consists, therefore, in an innovating structure having characteristics unknown to this moment for the object to which it is designed, reasons that, jointly with its practical utility, endow it with ground sufficient to obtain the privilege of exclusivity applied for.

Sufficiently disclosed the nature of this invention, it is not deemed necessary to extend any longer its explanation in order that a person skilled in the art understands its extent and the advantages derived from it, and it is stated that, within its essence, it can be implemented in embodiments that differ in detail of the above mentioned and to which the protection sought shall extend provided that its fundamental is not altered.

The invention claimed is:

1. A sexual toy characterized in that it comprises a composite material formed by joining at least two components and an external sheath of silicone, where a first component is an elastomer, and a second component is a granulated element corresponding to a mixture of particles of an aggregate, the mixture of particles of the aggregate having a diameter of 0.063 to 2 millimeters and a plastic core therein that is less flexible than the composite material.

2. The sexual toy according to the claim 1 characterized in that the elastomer is a thermoplastic elastomer.

3. The sexual toy according to the claim 2, characterized in that the elastomer has a viscosity sufficient to prevent the relative movement of the granulated element within the elastomer in melted phase.

4. A sexual toy characterized in that it comprises a composite material formed by joining at least two components, where a first component is an elastomer, and a second component is a granulated element corresponding to a mixture of particles of an aggregate and of an expanded or foamed polymer, the expanded or foamed polymer being at least one of expanded polypropylene (EPP), expanded polyethylene (EPE), or expanded polystyrene (EPS).

5. The sexual toy according to the claim 4 characterized in that the expanded or foamed polymer is expanded polypropylene (EPP).

6. The sexual toy according to the claim 4 characterized in that the expanded or foamed polymer is expanded polyethylene (EPE).

7. The sexual toy according to the claim 4 characterized in that the expanded or foamed polymer is expanded polystyrene (EPS).

8. The sexual toy according to the claim 4 characterized in that the expanded or foamed polymer is expanded polypropylene (EPP) and/or expanded polyethylene (EPE) and/or expanded polystyrene (EPS).

* * * * *